US011799916B2

(12) United States Patent
Lehtovirta et al.

(10) Patent No.: US 11,799,916 B2
(45) Date of Patent: Oct. 24, 2023

(54) HANDLING RADIO LINK FAILURE IN A NARROW BANDWIDTH INTERNET OF THINGS CONTROL PLANE

(71) Applicant: Telefonaktiebolaget LM Ericsson (publ), Stockholm (SE)

(72) Inventors: Vesa Lehtovirta, Espoo (FI); Christine Jost, Lund (SE); Monica Wifvesson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 209 days.

(21) Appl. No.: 16/347,660

(22) PCT Filed: Nov. 2, 2017

(86) PCT No.: PCT/EP2017/078012
§ 371 (c)(1),
(2) Date: May 6, 2019

(87) PCT Pub. No.: WO2018/083151
PCT Pub. Date: May 11, 2018

(65) Prior Publication Data
US 2019/0320318 A1 Oct. 17, 2019

Related U.S. Application Data

(60) Provisional application No. 62/418,487, filed on Nov. 7, 2016.

(51) Int. Cl.
*H04L 9/00* (2022.01)
*H04L 9/40* (2022.01)
(Continued)

(52) U.S. Cl.
CPC ......... *H04L 63/205* (2013.01); *H04W 12/041* (2021.01); *H04W 12/106* (2021.01); *H04W 12/108* (2021.01)

(58) Field of Classification Search
CPC .. H04L 63/205; H04W 12/106; H04W 12/108
(Continued)

(56) References Cited

U.S. PATENT DOCUMENTS 8,423,769 B2 * 4/2013 Han .................... H04W 12/041
713/168
9,497,673 B2 * 11/2016 Blankenship ....... H04W 12/084
(Continued)

FOREIGN PATENT DOCUMENTS

EP 1973265 A1 9/2008
WO WO 2010/025280 A2 3/2010

OTHER PUBLICATIONS

3GPP TS 36.331 version 13.0.0 Release 13 1 ETSI TS 136 331 V13.0.0 (Jan. 2016).*
(Continued)

*Primary Examiner* — Christopher J Brown
(74) *Attorney, Agent, or Firm* — SAGE PATENT GROUP

(57) ABSTRACT

A method of operating a user equipment, UE, includes establishing a radio resource control, RRC, connection with a base station, following establishment of the RRC connection, sending an indication of a security capability of the UE to the base station, receiving a non-access stratum, NAS, message, from the base station, wherein the NAS message identifies a selected security algorithm, and generating the access stratum security key to be used with the selected security algorithm.

18 Claims, 9 Drawing Sheets

(51) Int. Cl.
    *H04W 12/041*     (2021.01)
    *H04W 12/106*     (2021.01)
    *H04W 12/108*     (2021.01)

(58) Field of Classification Search
    USPC .......................................................... 713/186
    See application file for complete search history.

(56) References Cited

U.S. PATENT DOCUMENTS

| | | | |
|---|---|---|---|
| 2012/0178417 A1* | 7/2012 | Hapsari | H04W 76/10 |
| | | | 455/411 |
| 2013/0014210 A1 | 1/2013 | Arnott et al. | |
| 2013/0260810 A1* | 10/2013 | Rayavarapu | H04W 76/19 |
| | | | 455/509 |

OTHER PUBLICATIONS

International Search Report and Written Opinion of the International Searching Authority, PCT/EP2017/078012 dated Feb. 20, 2018, 12 pages.

ETSI TS 136 413 v13.4.0 (Oct. 2016), Technical Specification, LTE; Evolved Universal Terrestrial Radio Access Network (E-UTRAN); S1 Application Protocol (S1AP) (3GPP TS 36.413 version 13.4.0 Release 13), 500 pages.

* cited by examiner

HANDLING RADIO LINK FAILURE IN A NARROW BANDWIDTH INTERNET OF THINGS CONTROL PLANE

CROSS REFERENCE TO RELATED APPLICATIONS

This application is a 35 U.S.C. § 371 national stage application of PCT International Application No. PCT/EP2017/078012 filed on Nov. 2, 2017, which in turn claims domestic priority to U.S. Provisional Patent Application No. 62/418,487 filed on Nov. 7, 2016, the disclosures and content of which are incorporated by reference herein in their entirety.

TECHNICAL FIELD

The present disclosure relates to methods and operations by network nodes and user equipments in wireless communication networks.

BACKGROUND

Control Plane (CP) Cellular Internet of Things (CIoT) optimization (also called Data Over NAS, or DoNAS) is a solution for transporting data over the Non-access Stratum (NAS) as specified in 3GPP TS 23.401 clause 5.3.4B and other specifications, such as 3GPP TS 24.301. The security features for DoNAS are specified in TS 33.401 clause 8.2, which is brief, since the security impact of the basic solution is very limited. The purpose of the DoNAS feature is to enable sending of data over NAS signalling without establishing data radio bearers (DRBs) and without establishing Access Stratum (AS) security. The intention is to reduce the amount of signalling needed to transport data in a CIoT environment. FIG. 1 illustrates the principle.

As shown in FIG. 1, an idle UE 200 may establish a Radio Resource Control (RRC) connection with a base station 300, such as an eNodeB or eNB (block 1). The UE 200 may send an NAS Data Protocol Data Unit (PDU) to the base station 300 with an EPS Bearer Identity (EBI). The base station 300 sends an Initial UE Message including the NAS Data PDU over the S1-AP signalling interface to a core network node 400, such as a Mobility Management Entity (MME) (arrow 2). The core network node 400 checks the integrity of the Initial UE Message and decrypts the data (block 3) and sends a Modify Bearer Request through a signalling gateway (S-GW) 500A to a packet gateway (P-GW) 500B (arrows 4, 5). Upon receiving a response to the Modify Bearer Request (arrows 6, 7), the core network node 400 sends the uplink data to the P-GW 500B (arrow 8) and receives downlink data in response (arrow 9). The core network node 400 may encrypt and/or encode the data (block 10) and then transmit the data to the base station 300 in a downlink S1-AP message, followed by a S1-AP UE context release message (arrow 11). The base station 300 then transmits the data to the UE 200 in an RRC downlink (DL) message (block 12).

A work item in RAN (R3-161324) addresses mobility enhancements for CP-CIoT. Handovers are not supported for CP-CIoT. Thus, if the UE 200 moves away from its serving base station 300, a radio link failure (RLF) will occur when the UE 200 is in connected mode, i.e., when the UE 200 has a Radio Resource Control (RRC) connection with the base station. This has raised the issue of what to do in such case. Since AS security is not supported for the CP-CIoT feature, the existing mechanisms for RLF cannot be used "as is."

Approaches described in the Background section could be pursued, but are not necessarily approaches that have been previously conceived or pursued. Therefore, unless otherwise indicated herein, the approaches described in the Background section are not prior art to the inventive embodiments disclosed in this application and are not admitted to be prior art by inclusion in the Background section. Therefore, any description contained in the Background section may be moved to the Detailed Description section.

SUMMARY

A method of operating a user equipment, UE, according to some embodiments includes establishing a radio resource control, RRC, connection with a base station, following establishment of the RRC connection, sending an indication of a security capability of the UE to the base station, receiving a non-access stratum, NAS, message, from the base station, wherein the NAS message identifies a selected security algorithm, and generating the access stratum security key to be used with the selected security algorithm.

The selected security algorithm may be for protecting access stratum communications between the UE and base station.

The method may further include using the access stratum security key and the selected security algorithm to protect access stratum communications with the base station.

The NAS message may include a NAS security mode command.

The base station may include an eNodeB.

The selected security algorithm may include an integrity algorithm.

The access stratum security key may include an RRC message integrity key, Krrc_int.

Sending the indication of the security capability of the UE to the base station may include sending a request to the base station, the request including the indication of the security capability of the UE.

The request may include an Attach request.

The method may further include generating a base station key KeNB, and generating the access stratum security key may include generating the access stratum security key using the base station key KeNB and the selected integrity algorithm identifier.

The method may further include generating an RRC integrity token using the selected security algorithm and the access stratum key, and in response to a link failure between the UE and the source base station, transmitting the RRC integrity token to a target base station.

The base station key KeNB and the access stratum security key may be generated prior to the link failure.

Transmitting the RRC integrity token to the target base station may include transmitting the integrity token in an RRC ConnRe-est Request message.

The method may further include receiving an RRC ConnRe-est Setup message in response to the RRC ConnRe-est Request message, and in response to receiving the RRC ConnRe-est Setup message, transmitting an NAS Data protocol data unit (PDU) to the target base station.

A computer program product according to some embodiments includes a non-transitory computer readable medium storing program code that when executed by a processor of the UE causes the UE to establish a radio resource control, RRC, connection with a base station, following establishment of the RRC connection, send an indication of a security capability of the UE to the base station, receive a non-access stratum, NAS, message, from the base station, wherein the NAS message identifies a selected security algorithm, and generate the access stratum security key to be used with the selected security algorithm Some embodiments provide a UE adapted to establish a radio resource control, RRC, connection with a base station, following establishment of the RRC connection, send an indication of a security capability of the UE to the base station, receive a non-access stratum, NAS, message, from the base station, wherein the NAS message identifies a selected security algorithm, and generate the access stratum security key to be used with the selected security algorithm.

A UE according to some embodiments includes a transceiver, at least one processor coupled to the transceiver, and at least one memory coupled to the at least one processor and storing program code that when executed by the at least one processor causes the at least one processor to perform operations including establishing a radio resource control, RRC, connection with a base station, following establishment of the RRC connection, sending an indication of a security capability of the UE to the base station, receiving a non-access stratum, NAS, message, from the base station, wherein the NAS message identifies a selected security algorithm, and generating the access stratum security key to be used with the selected security algorithm.

A UE according to some embodiments includes a radio interface module for establishing a radio resource control, RRC, connection with a base station, following establishment of the RRC connection, sending an indication of a security capability of the UE to the base station, and receiving a non-access stratum, NAS, message, from the base station, wherein the NAS message identifies a selected security algorithm, and a security module for generating the access stratum security key to be used with the selected security algorithm.

A method of operating a network node of a cellular radio access network, RAN, according to some embodiments includes establishing a radio resource control, RRC, connection with a user equipment, UE, following establishment of the RRC connection, receiving an indication of a security capability of the UE from the UE, generating a list of security algorithms supported by the network node, transmitting the list of supported security algorithms to a core network node, receiving, from the core network node, a selected security algorithm, and sending the selected security algorithm to the UE.

The selected security algorithm may include a radio resource control, RRC, integrity algorithm.

The method may further include using the selected security algorithm to protect access stratum communications with the UE.

Sending the selected security algorithm to the UE may include sending a non-access stratum, NAS, message to the UE.

The NAS message may include a transport message that contains a NAS security mode command.

The method may further include receiving a base station key KeNB from the core network node, and generating an RRC message integrity key Krrc_int using the base station key KeNB.

The method may further include receiving an RRC message integrity key Krrc_int from the core network node.

Receiving the selected security algorithm from the core network node may include receiving a non-access stratum, NAS, Transport message from the core network node, wherein the NAS Transport message identifies the selected security algorithm.

Sending the selected security algorithm to the UE may include sending an NAS message to the UE, wherein the NAS message identifies the selected integrity algorithm.

The NAS message may include an NAS security mode command.

The core network node may include a mobility management entity.

A computer program product according to some embodiments includes a non-transitory computer readable medium storing program code that when executed by a processor of the network node causes the network node to establish a radio resource control, RRC, connection with a user equipment, UE, following establishment of the RRC connection, receive an indication of a security capability of the UE from the UE, generate a list of security algorithms supported by the network node, transmit the list of supported security algorithms to a core network node, receive, from the core network node, a selected security algorithm, and send the selected security algorithm to the UE.

Some embodiments provide a network node adapted to establish a radio resource control, RRC, connection with a user equipment, UE, following establishment of the RRC connection, receive an indication of a security capability of the UE from the UE, generate a list of security algorithms supported by the network node, transmit the list of supported security algorithms to a core network node, receive, from the core network node, a selected security algorithm, and send the selected security algorithm to the UE.

A network node according to some embodiments includes a transceiver, at least one processor coupled to the transceiver, and at least one memory coupled to the at least one processor and storing program code that when executed by the at least one processor causes the at least one processor to perform operations including establishing a radio resource control, RRC, connection with a user equipment, UE, following establishment of the RRC connection, receiving an indication of a security capability of the UE from the UE, generating a list of security algorithms supported by the network node, transmitting the list of supported security algorithms to a core network node, receiving, from the core network node, a selected security algorithm, and sending the selected security algorithm to the UE.

A network node according to some embodiments includes a radio interface module for establishing a radio resource control, RRC, connection with a user equipment, and receiving an indication of a security capability of the UE from the UE, and a security algorithm module for generating a list of security algorithms supported by the network node, wherein the radio interface module is further configured for transmitting the list of supported security algorithms to a core network node, receiving from the core network node a selected security algorithm, and sending the selected security algorithm to the UE.

A method of operating a core network node of a cellular radio access network, RAN, according to some embodiments includes receiving, from a base station that serves a user equipment, UE, a list of security algorithms supported by the base station, selecting a security algorithm from the list of security algorithms, and transmitting a message identifying the selected security algorithm to the base station.

Receiving the list of integrity algorithms may include receiving an Initial UE message using an S1-AP signalling interface.

Selecting the security algorithm may include selecting a security algorithm that has a highest priority among security algorithms on the list of security algorithms supported by the base station that are also supported by the UE.

The method may further include deriving a base station key KeNB, and transmitting the base station key KeNB to the base station.

The method may further include receiving a non-access stratum, NAS, data protocol data unit, PDU, from the UE, wherein generating the base station key KeNB may include generating the base station key KeNB using a NAS uplink, UL, count of the NAS data PDU.

The method may further include generating an access stratum security key, and transmitting the access stratum security key to the base station.

The access stratum security key may include an RRC message integrity key Krrc_int.

Transmitting the message identifying the selected integrity algorithm to the base station may include transmitting a downlink, DL, non-access stratum, NAS, message to the base station.

The security algorithm may include a radio resource control, RRC, integrity algorithm.

The core network node may include a mobility management entity.

A computer program product according to some embodiments includes a non-transitory computer readable medium storing program code that when executed by a processor of the network node causes the network node to receive, from a base station that serves a user equipment, UE, a list of security algorithms supported by the base station, select a security algorithm from the list of security algorithms, and transmit a message identifying the selected security algorithm to the base station.

Some embodiments provide a network node adapted to receive, from a base station that serves a user equipment, UE, a list of security algorithms supported by the base station, select a security algorithm from the list of security algorithms, and transmit a message identifying the selected security algorithm to the base station.

A network node according to some embodiments includes a transceiver, at least one processor coupled to the transceiver, and at least one memory coupled to the at least one processor and storing program code that when executed by the at least one processor causes the at least one processor to perform operations including receiving, from a base station that serves a user equipment, UE, a list of security algorithms supported by the base station, selecting a security algorithm from the list of security algorithms, and transmitting a message identifying the selected security algorithm to the base station.

A core network node according to some embodiments includes a radio interface module for receiving, from a base station that serves a user equipment, UE, a list of security algorithms supported by the base station, and an algorithm selection module for selecting a security algorithm from the list of security algorithms, wherein the radio interface module is further configured for transmitting a message identifying the selected security algorithm to the base station.

The core network node may include a mobility management entity.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DETAILED DESCRIPTION

Figure 1:
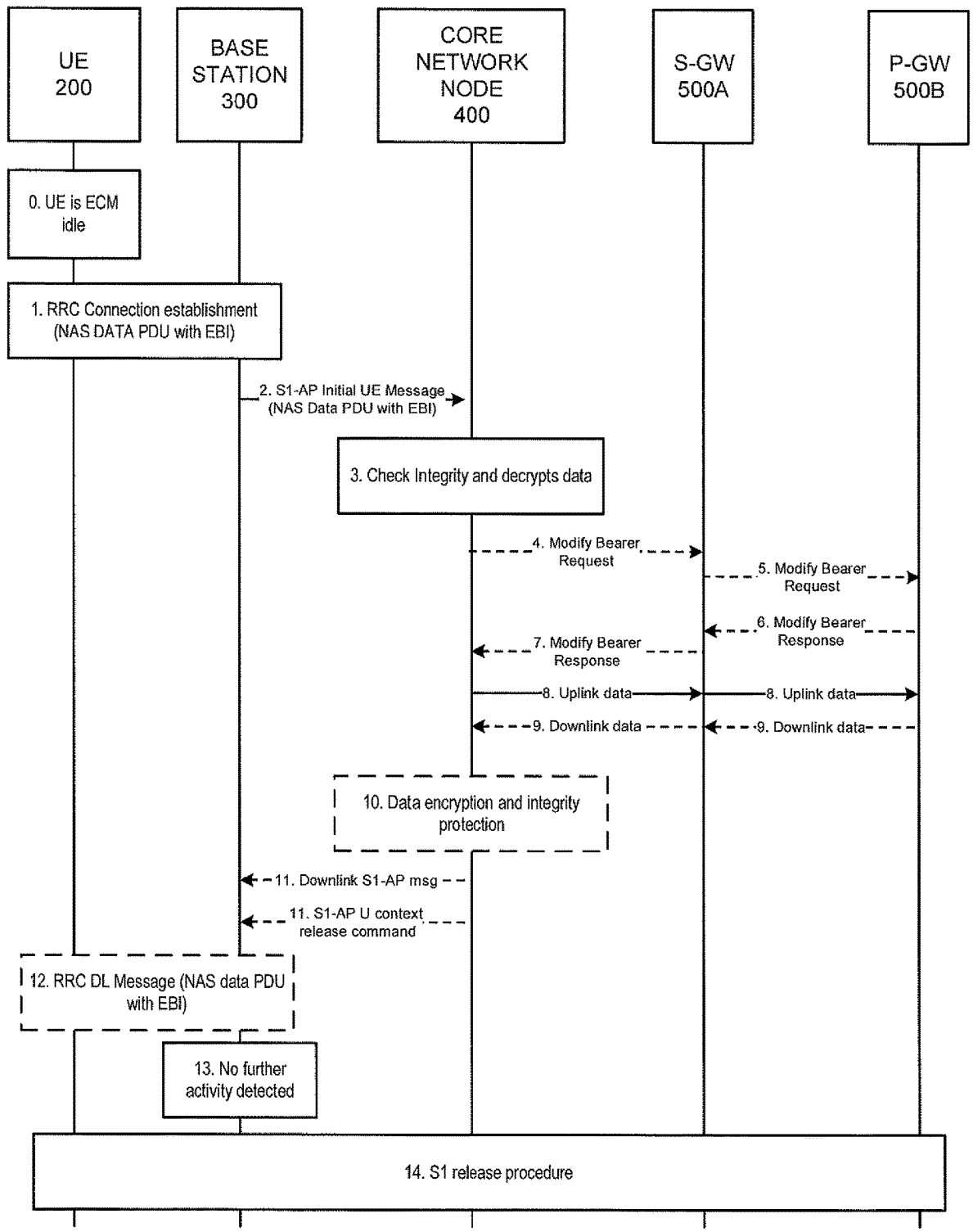
FIG. 1 is a flow diagram illustrating a Data over Non-access Stratum (DoNAS) scenario.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment. Any two or more embodiments described below may be combined in any way with each other. Moreover, certain details of the described embodiments may be modified, omitted, or expanded upon without departing from the scope of the described subject matter.

Terminology

In some embodiments a more general term "network node" is used and it can correspond to any type of radio network node or any network node, which communicates with a UE and/or with another network node. Examples of network nodes are NodeB, MeNB, SeNB, a network node belonging to MCG or SCG, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc), O&M, OSS, SON, positioning node (e.g. E-SMLC), MDT, etc.

In some embodiments the non-limiting term user equipment (UE) is used and it refers to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, ProSe UE, V2V UE, V2X UE, etc.

In some embodiments the non-limiting term WAN (wireless access network or RAN, radio access network) node is used. The WAN node can be a UE or a network node (e.g. access point, BS etc). The WAN node is also interchangeably called as cellular node, NW source node etc.

The term time resource used herein may correspond to any type of physical resource or radio resource expressed in terms of length of time. Examples of time resources are: symbol, time slot, subframe, radio frame, TTI, interleaving time etc.

The embodiments are described for LTE. However the embodiments are applicable to any RAT or multi-RAT systems, where the UE receives and/or transmit signals (e.g. data) e.g. LTE FDD/TDD, WCDMA/HSPA, GSM/GERAN, Wi Fi, WLAN, CDMA2000, 5G, NR, etc.

RRC connection re-establishment and RRC connection suspend/resume are existing solutions that could be candidates for handling the radio link failure (RLF) in the case of CP-CIoT optimization. Both of those existing solutions use an authentication token (called also short MAC-I) to show to the base station that a genuine UE wants to re-establish or resume an RRC connection. Those solutions rely on the existence of AS security, and especially RRC security. However, AS security and RRC security do not exist or are not used for CP-CIoT optimizations.

A solution presented in S3-161717 (3GPP TSG SA WG3 (Security) Meeting #85) proposes that an authentication token would be based on an RRC integrity key derived by the MME without setting up RRC security via an AS Security Mode Command (SMC) procedure. The token would be used for use protecting AS communications between the UE and the target base station. However, since the AS SMC procedure is not supported for CP-CIoT, the UE and base station may not be able to agree on a common integrity algorithm that would be used for token calculation and verification.

Overview of Embodiments

Various embodiments of the present disclosure are directed to operations and methods by UEs and network nodes, including base stations and core network nodes, for performing communications.

In the absence of AS security for CP-CIoT optimizations, the main problems for token usage (calculation and verification) are how the integrity algorithm used for token calculation is negotiated, how keys used for the token are derived, and which entities should calculate/verify the token.

According to some embodiments described herein, during an Attach procedure following RRC connection setup, a base station provides a prioritized list of supported security algorithms, such as supported algorithms, to a core network node, such as an MME, using S1 signalling. The MME, which knows the UE capabilities and the base station supported algorithms from the Attach message, chooses an integrity algorithm for the token calculation. The MME indicates this to the UE in an NAS SMC and to the base station in an S1 message.

Although described herein in connection with an MME, the functionality described herein can be performed by any suitably configured core network node. Moreover, although the terms eNB, eNodeB and base station are used interchangeably in this description, it will be appreciated that other types of base stations are encompassed by these terms. That is, the terms "eNB" and "eNodeB" are used to refer to base stations in Long Term Evolution (LTE) networks, other terms may be used to refer to base stations in other types of cellular communication networks, and all such uses are envisioned to be within the scope of the present disclosure.

Continuing with the description of embodiments, the MME sends an eNB key (KeNB) to the eNB in an S1 message. The eNB and the UE each calculate an RRC message integrity key (Krrc_int) using the chosen algorithm identifier as an input. The UE calculates, and the source eNB verifies, the token using the chosen integrity algorithm and Krrc_int.

Some embodiments described herein may provide procedures for handling token calculation in the event of a radio link failure (RLF) during CP-CIoT in similar way as RRC suspend/resume does.

Figure 2:
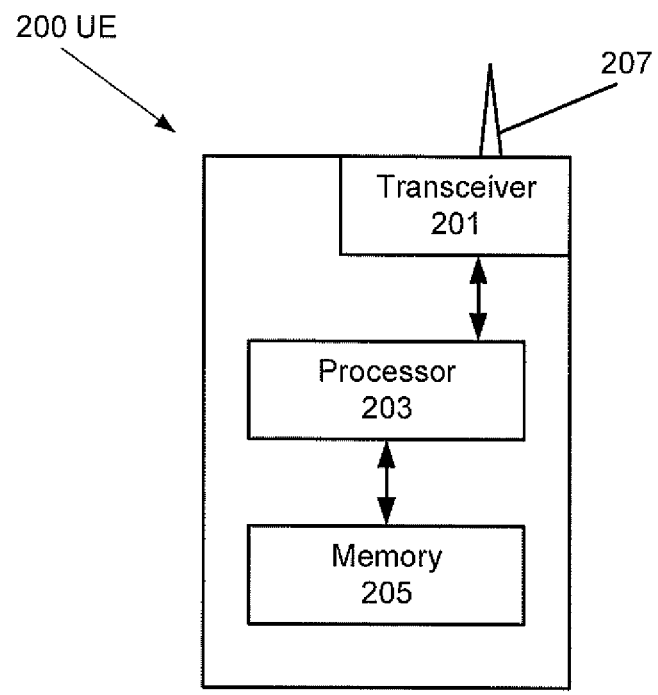
FIG. 2 is a block diagram illustrating a UE according to some embodiments.

Example Elements of UE and Network Node:

FIG. 2 is a block diagram illustrating elements of a UE 200 (also referred to as a wireless terminal, a wireless communication device, a wireless communication terminal, user equipment, a user equipment node/terminal/device, etc.) configured to provide operations according to embodiments of inventive concepts. As shown, the UE 200 may include an antenna 207, and a transceiver circuit 201 (also referred to as a transceiver) including a transmitter and a receiver configured to provide uplink and downlink radio communications with a base station of a radio access network, and to provide communications with other wireless communication devices. The UE 200 may also include a processor circuit 203 (also referred to as a processor) coupled to the transceiver circuit, and a memory circuit 205 (also referred to as memory) coupled to the processor circuit. The memory circuit 205 may include computer readable program code that when executed by the processor circuit 203 causes the processor circuit to perform operations according to embodiments disclosed herein for a UE. According to other embodiments, processor circuit 203 may be defined to include memory so that a separate memory circuit is not required. The UE 200 may also include an interface (such as a user interface) coupled with processor 203, and/or the UE 200 may be incorporated in a vehicle.

As discussed herein, operations of the UE 200 may be performed by processor 203 and/or transceiver 201. For example, processor 203 may control transceiver 201 to transmit communications through transceiver 201 over a radio interface to another node and/or to receive communications through transceiver 201 from another node over a radio interface. Moreover, modules may be stored in memory 205, and these modules may provide instructions so that when instructions of a module are executed by processor 203, processor 203 performs respective operations (e.g., operations discussed below with respect to example embodiments).

Figure 3A:
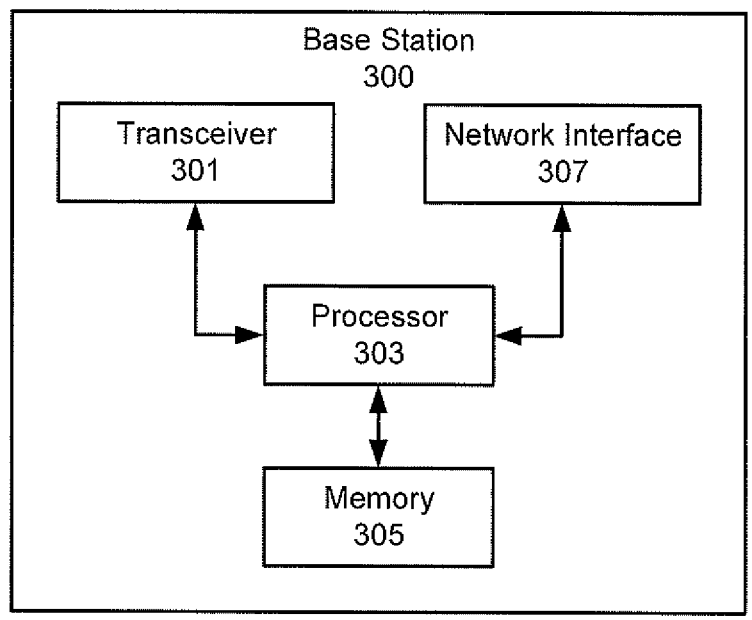
FIG. 3A is a block diagram illustrating a base station of a radio access network (RAN) according to some embodiments.

FIG. 3A is a block diagram illustrating elements of a base station 300 (also referred to as a node, base station, eNB, eNodeB, etc.) of a Radio Access Network (RAN) configured to provide cellular communication according to embodiments of inventive concepts. As shown, the base station 300 may include a transceiver circuit 301 (also referred to as a transceiver) including a transmitter and a receiver configured to provide uplink and downlink radio communications with UEs. The base station 300 may include a network interface circuit 307 (also referred to as a network interface) configured to provide communications with other nodes (e.g., with other base stations) of the RAN. The base station 300 may also include a processor circuit 303 (also referred to as a processor) coupled to the transceiver circuit, and a memory circuit 305 (also referred to as memory) coupled to the processor circuit. The memory circuit 305 may include computer readable program code that when executed by the processor circuit 303 causes the processor circuit to perform operations according to embodiments disclosed herein. According to other embodiments, processor circuit 303 may be defined to include memory so that a separate memory circuit is not required.

As discussed herein, operations of the base station 300 may be performed by processor 303, network interface 307, and/or transceiver 301. For example, processor 303 may control transceiver 301 to transmit communications through transceiver 301 over a radio interface to one or more UEs and/or to receive communications through transceiver 301 from one or more UEs over a radio interface. Similarly, processor 303 may control network interface 307 to transmit communications through network interface 307 to one or more other network nodes and/or to receive communications through network interface from one or more other network nodes. Moreover, modules may be stored in memory 305, and these modules may provide instructions so that when instructions of a module are executed by processor 303, processor 303 performs respective operations (e.g., operations discussed below with respect to example embodiments of network nodes).

Figure 3B:
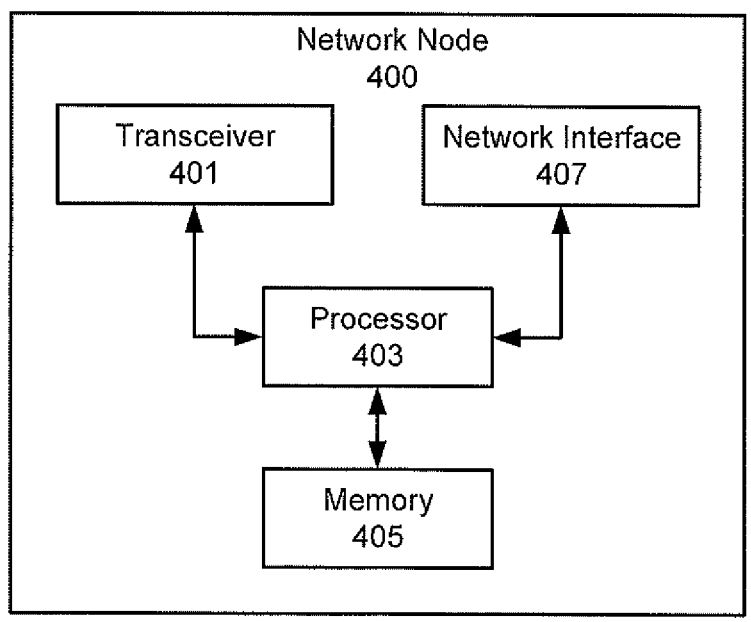
FIG. 3B is a block diagram illustrating a network node of a radio access network (RAN) according to some embodiments.

FIG. 3B is a block diagram illustrating elements of a core network node 400 (also referred to as a node) of a Radio Access Network (RAN) configured to enable cellular communication according to embodiments of inventive concepts. As shown, the core network node 400 may include a transceiver circuit 401 (also referred to as a transceiver) including a transmitter and a receiver configured to provide uplink and downlink radio communications with UEs. The core network node 400 may include a network interface circuit 407 (also referred to as a network interface) configured to provide communications with other nodes (e.g., with other base stations) of the RAN. The network node may also include a processor circuit 403 (also referred to as a processor) coupled to the transceiver circuit, and a memory circuit 405 (also referred to as memory) coupled to the processor circuit. The memory circuit 405 may include computer readable program code that when executed by the processor circuit 403 causes the processor circuit to perform operations according to embodiments disclosed herein. According to other embodiments, processor circuit 403 may be defined to include memory so that a separate memory circuit is not required.

As discussed herein, operations of the core network node 400 may be performed by processor 403, network interface 407, and/or transceiver 401. For example, processor 403 may control transceiver 401 to transmit communications through transceiver 401 over a radio interface to one or more UEs and/or to receive communications through transceiver 401 from one or more UEs over a radio interface. Similarly, processor 403 may control network interface 407 to transmit communications through network interface 407 to one or more other network nodes and/or to receive communications through network interface from one or more other network nodes. Moreover, modules may be stored in memory 405, and these modules may provide instructions so that when instructions of a module are executed by processor 403, processor 403 performs respective operations (e.g., operations discussed below with respect to example embodiments of network nodes).

Attach Procedure for CP-IoT

Figure 4:
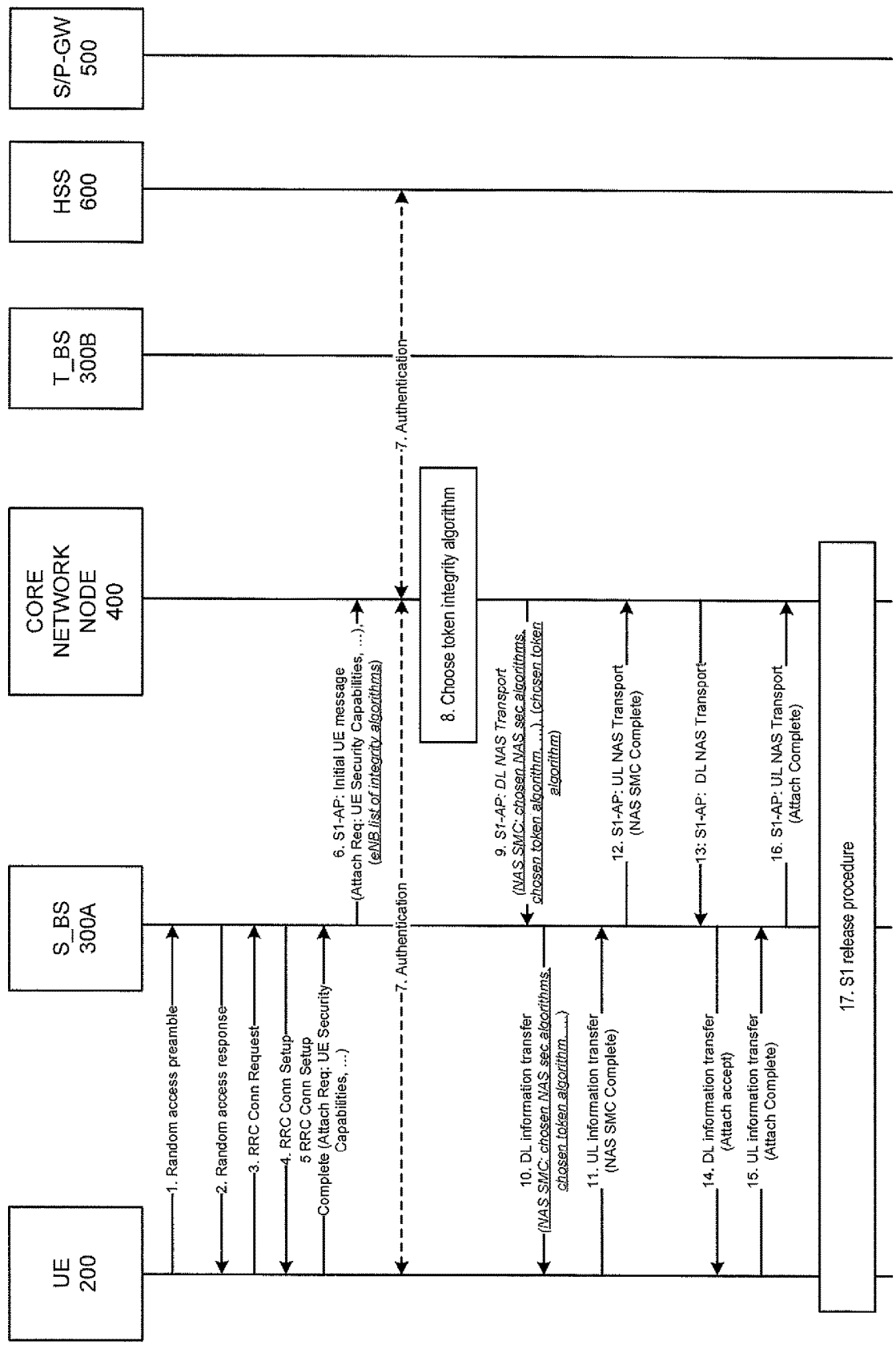
FIG. 4 is a flow diagram illustrating operations of systems/methods for selecting a token integrity algorithm according to some embodiments.

Some embodiments provide an Attach procedure for CP-IoT optimizations with algorithm negotiation for token. In particular, FIG. 4 shows an Attach procedure for CP-CIoT according to some embodiments. The operations illustrated in FIG. 4 are based on clause 5.3.2 of TS 23.401, with modifications shown as underlined italics text in the figure.

Referring to FIG. 4, in steps 1-5, the UE 200 sets up an RRC connection with the base station 300 and sends an Attach request to the source base station (S_BS) 300A.

Step 6. The base station 300A forwards the Attach request to a core network node 400, such as a mobility management entity, MME, in an Initial UE message over the S1-AP signalling interface. According to some embodiments, in addition to the Attach request, the base station 300 also includes a list of supported security algorithms, such as AS integrity algorithms. The list of supported integrity algorithms may be sorted in order of priority.

In some embodiments, the core network node 400 may already be aware of the algorithms supported by the base station 300, e.g. via configuration. In this case the base station 300 may not need to send the algorithm list to the core network node 400.

Step 7. The core network node 400 authenticates the UE 200.

Step 8. According to some embodiments, upon receiving the Initial UE message, the core network node 400 compares the integrity algorithms supported by the UE 200 (which were received in the Attach request as part of UE capabilities) to the list of integrity algorithms supported by the base station 300A. The core network node 400 selects a token integrity algorithm that is supported by both the base station 300 and the UE 200. In some embodiments, the core network node 400 may select the token integrity algorithm that has the highest priority in the base station list and that is supported by the UE 200.

Step 9. The core network node 400 sends the NAS SMC to the base station 300A in a DL NAS transport message. According to some embodiments, the core network node 400 includes the selected token integrity algorithm in the NAS SMC. The core network node 400 also includes the chosen token integrity algorithm in the S1 DL transport message, i.e. outside the NAS SMC, so that the base station 300A can receive it.

Step 10. When the base station 300A receives the DL transport message, it sends the (new) NAS SMC message to the UE 200. The base station 300A also extracts the chosen token integrity algorithm and stores it for possible future radio link failure (RLF) handling.

When the UE 200 receives the (new) NAS SMC from the base station 300A, it stores also the chosen token integrity algorithm for possible future RLF handling.

Steps 11.-17. The remainder of the process follows existing procedures.

The algorithm negotiation mechanism described herein is a standalone mechanism and can be used with any token calculation mechanism needing an integrity algorithm. It should be noted that the same or similar mechanism could also be used to negotiate any algorithms, or other capabilities, to be used between the UE 200 and the base station 300.

Sending NAS Data for CP-CIoT Optimizations; RLF Handling

Figure 5:
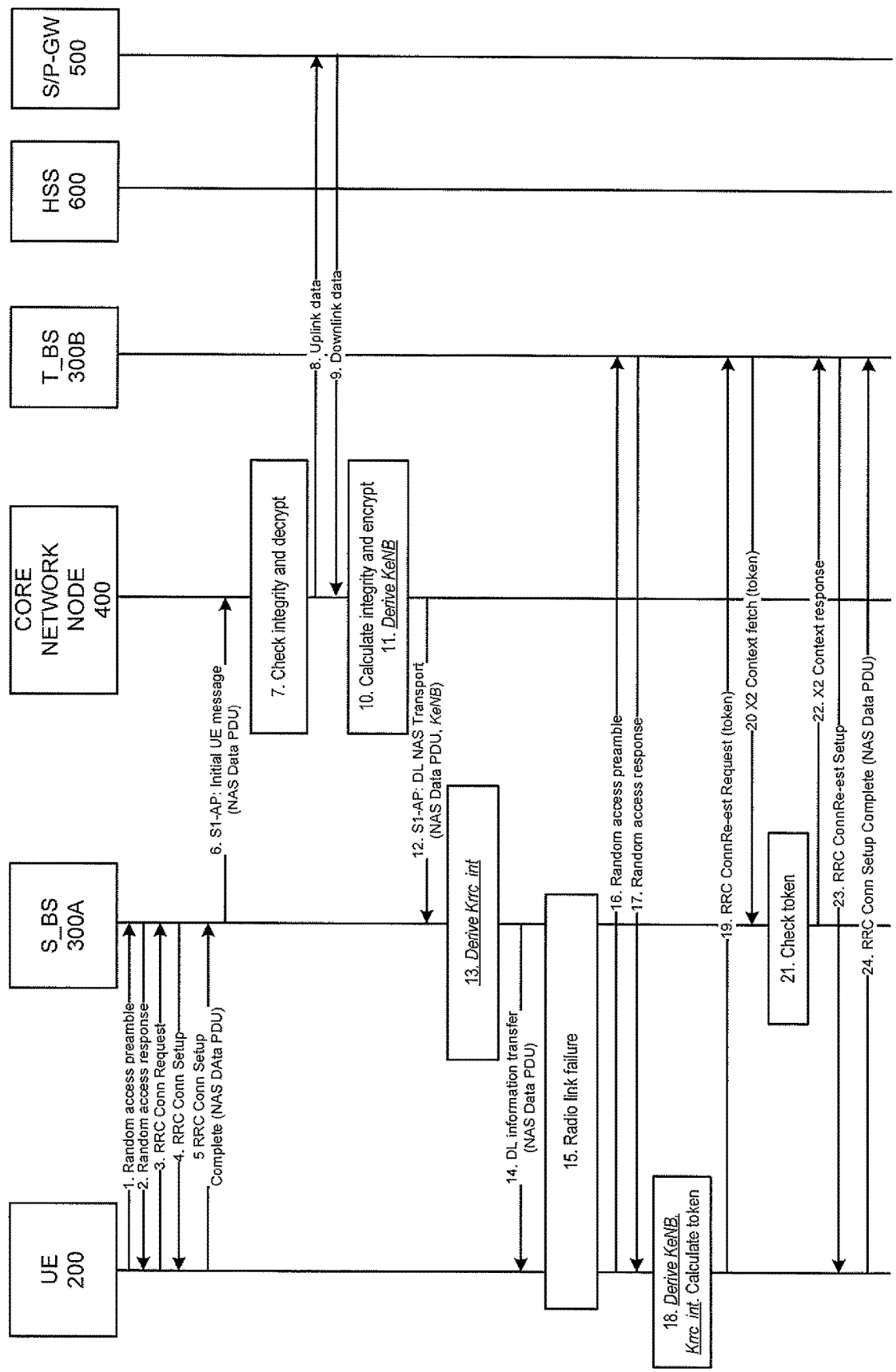
FIG. 5 is a flow diagram illustrating operations of systems/methods for handling a radio link failure according to some embodiments.

Some embodiments provide systems/methods that can handle a radio link failure while sending NAS data in a CP-CIoT optimization. In particular, FIG. 5 illustrates an example of how RLF can be handled while sending NAS data in a CP-CIoT environment. FIG. 5 illustrates flows between a UE 200, a source eNB (S_BS) 300A, a core network node 400 (e.g., an MME), a target eNB (T_BS) 300B and signaling gateway/packet gateway (S-GW/P-GW) nodes 500.

Steps 1 to 8 are as defined in current specifications. In particular, the UE 200 sets up an RRC connection with the source base station 300A and sends data over NAS, which is forwarded from the core network node 400 to a S-GW/P-GW node 500.

Steps 9.-10. In this example, there is also downlink (DL) data to be delivered to the UE 200 by the S/P-GW 500 (Step 9). In step 10, DL data to be delivered to the UE is encrypted to be sent in a NAS data PDU from the core network node 400 to the source base station 300A using DL NAS transport.

Step 11. The core network node 400 derives an eNB key (KeNB) using the NAS UL count, that is, the NAS UL count of the NAS message that included the NAS data PDU.

Step 12. The core network node 400 sends the KeNB to the source base station 300A in an DL NAS transport message. This can be the same DL NAS transport message in which the DL NAS data PDU is sent or some other S1 message from the core network node 400 to the source base station 300.

In some embodiments, since the core network node 400 knows the chosen token integrity algorithm and the KeNB, the core network node 400 can derive the RRC message integrity key (Krrc_int) and send the RRC message integrity key Krrc_int to the source base station 300A.

Step 13. The source base station 300A stores the KeNB, and derives the RRC message integrity key Krrc_int using the integrity algorithm identifier which was indicated by the core network node 400 in step 9 of the Attach procedure of FIG. 4.

Step 14. The source base station 300A sends the NAS data PDU to the UE 200.

Step 15. In this example, a radio link failure (RLF) happens at this point. However, a RLF could also happen before the UE 200 has received the DL data.

Steps 16.-17. The UE 200 starts an RRC connection re-establishment procedure to the target base station (T_BS) 300B.

Step 18. According to some embodiments, the UE 200 derives the eNB key KeNB in a similar manner as the core network node 400 did, and derives the RRC message integrity key Krrc_int from the KeNB in a similar manner as the source base station 300A did. In some embodiments, the key derivation can happen before this point. For example, the key derivation can happen any time after the UE 200 has received information on the selected integrity algorithm from the core network node 400 and sent the NAS data PDU.

The UE 200 generates a token using the following inputs to the selected integrity algorithm: Cell-targetCell-ID, source PCI and source C_RNTI (similarly as in RRC resume) and Krrc_int as the key, with the new aspect here being the integrity algorithm.

Step 19. The UE 200 sends the token to the target base station 300B in an RRC ConnRe-est request (or similar) message.

Step 20. Upon receiving the token, the target base station 300B sends the token to the source base station 300A in an X2 message (e.g., an X2 context fetch).

Step 21. Upon receiving the token, the source base station 300A verifies the token using the RRC message integrity key Krrc_int and the previously stored integrity algorithm (in a procedure similar to an RRC resume). The source base station 300A also checks to see if the target base station 300B is authorized to use the indicated target Cell-ID.

Step 22. If the checks are ok, the source base station 300A sends the UE context to the target base station 300B in a X2 message (e.g., an X2 context response message).

Step 23. The target base station 300B stores the received UE context and sends RRC ConnRe-est setup message to the UE 200.

Step 24. Finally, the UE 200 sends the RRC ConnRe-est Complete message to the target base station 300B. The RRC connection is now re-established, and an NAS data PDU may be sent in this message.

It will be noted that since the CP-CIoT optimizations feature does not use AS security, the RRC messages may not be protected in the PDCP layer.

An additional aspect is replay protection. The UE 200 can use a counter for replay protection of tokens. The counter can be reset when a new eNB key KeNB is derived.

Figure 6:
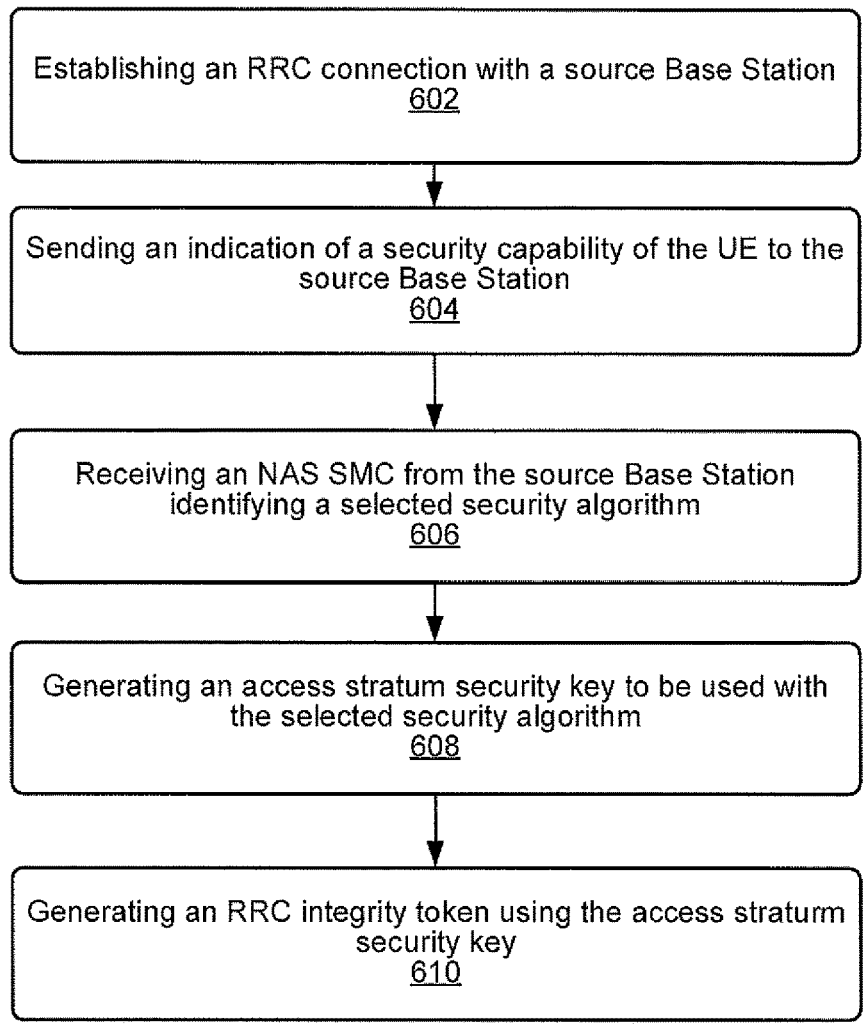
FIGS. 6 and 7 are flowcharts of operations and methods that can be performed by a UE according to some embodiments.

Operations of a UE 200 according to some embodiments are illustrated in FIG. 6. As shown therein, in some embodiments, a UE 200 establishes an RRC connection with a source base station 300A (Block 602). The UE 200 sends an indication of the security capability of the UE 200 to the source base station 300A (Block 604). The UE 200 then receives a non-access stratum (NAS) security mode command (SMC) from the source base station 300A. The NAS SMC identifies a selected integrity algorithm that the UE 200 can use to generate an RRC message integrity key Krrc_int (Block 606). The UE 200 then generates the RRC message integrity key Krrc_int using the selected integrity algorithm (Block 608). The UE 200 can then generate an RRC integrity token using the RRC message integrity key Krrc_int (Block 610).

Figure 7:
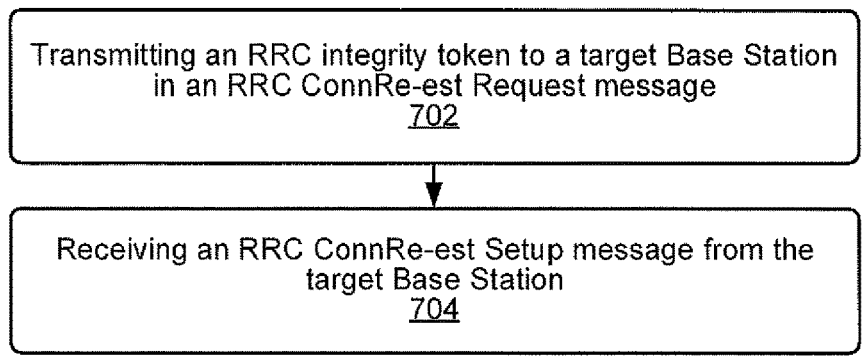

Operations of a UE 200 in response to a radio link failure (RLF) are illustrated in FIG. 7. As shown therein, in response to a radio link failure, the UE 200 may transmit the RRC integrity token to a target base station 300B in an RRC ConnRe-est Request message (Block 702) and subsequently receive an RRC ConnRe-est Setup message from the target base station 300B (Block 704).

Figure 8:
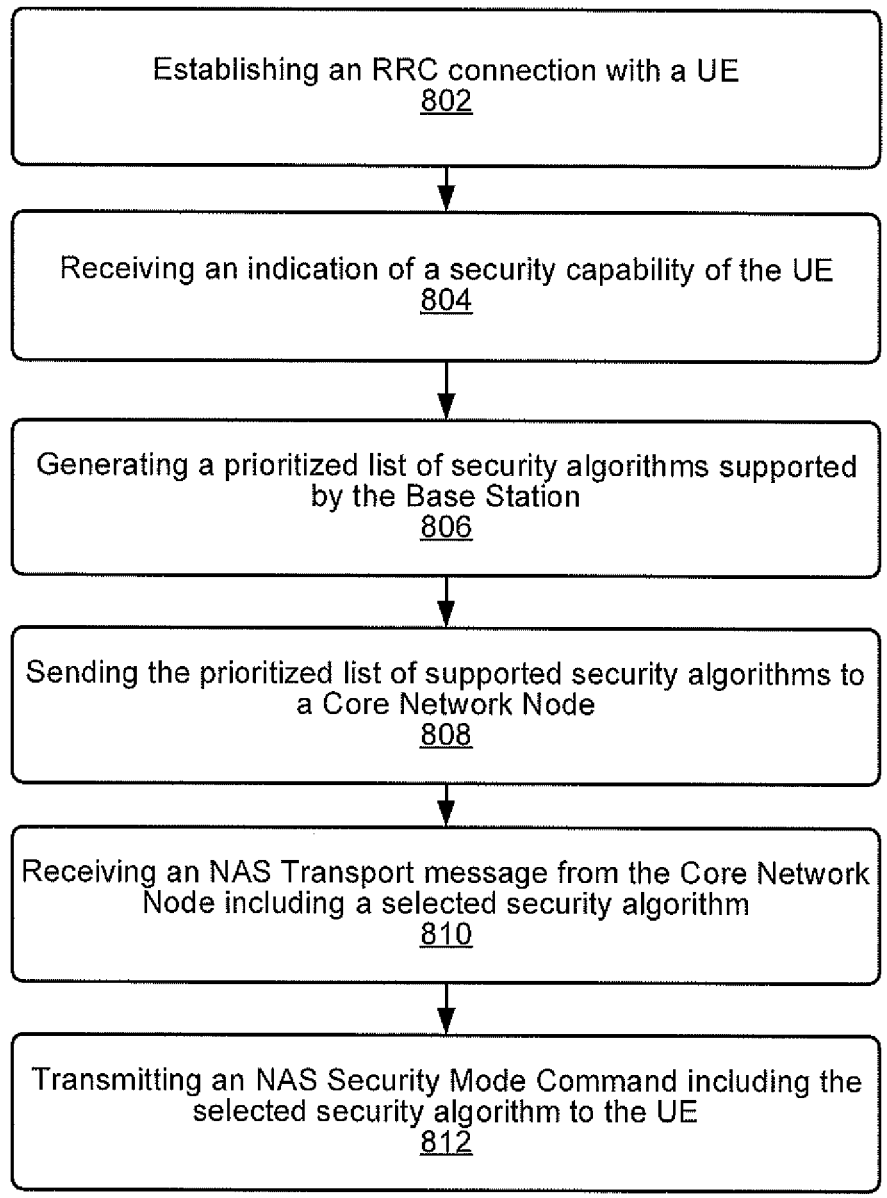
FIG. 8 is a flowchart of operations and methods that can be performed by an eNodeB network node according to some embodiments.

Operations of an eNodeB according to some embodiments are illustrated in FIG. 8. As shown therein, in some embodiments, the source base station 300A may establish an RRC connection with a UE 200 (Block 802). Following establishment of the RRC connection, the source base station 300A may receive an indication of a security capability of the UE 200 from the UE 200 (Block 804). The source base station 300A may generate a list of integrity algorithms supported by the eNodeB (Block 806) and transmit the list of supported integrity algorithms to a core network node 400 (Block 808). The source base station 300A may receive an NAS Transport message from the core network node 400, wherein the NAS Transport message identifies a selected integrity algorithm for generating an RRC message integrity key Krrc_int (Block 810), and send an NAS security mode command (SMC) to the UE 200, wherein the NAS SMC identifies the selected integrity algorithm (Block 812).

The eNodeB may provide the prioritized list of supported integrity algorithms to a core network node 400 during an Attach procedure using S1 signalling. The core network node 400, which knows the UE capabilities and the algorithms supported by the source base station 300A, selects an integrity algorithm for the token calculation, and the core network node 400 indicates the selected integrity algorithm to the UE 200 in an NAS SMC and to the source base station 300A in an S1 message.

Figure 9:
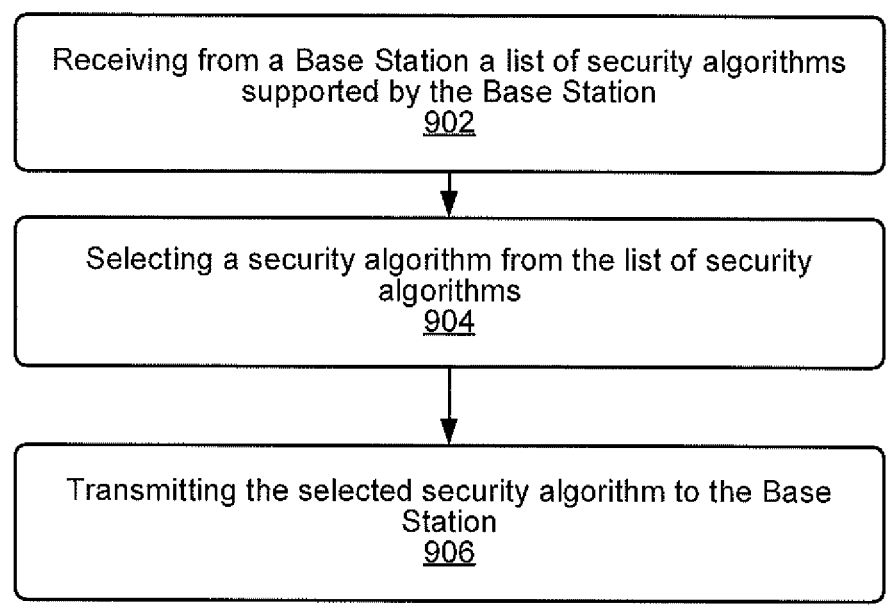
FIG. 9 is a flowchart of operations and methods that can be performed by a core network node according to some embodiments.

Operations of a core network node 400 according to some embodiments are illustrated in FIG. 9. As shown therein, the core network node 400 may receive (Block 902), from the source base station 300A, a list of integrity algorithms supported by the eNodeB for generating an RRC message integrity key Krrc_int. The core network node 400 selects (Block 904) an integrity algorithm from the list of integrity algorithms, and transmits (Block 906) a message identifying the selected integrity algorithm to the source base station 300A.

The core network node 400 may also send an eNB key KeNB to the source base station 300A in an S1 message. The source base station 300A and UE 200 calculate an RRC message integrity key Krrc_int using the selected algorithm. The UE 200 and the source base station 300A calculate and verify the token using the selected algorithm and Krrc_int.

Figure 10:
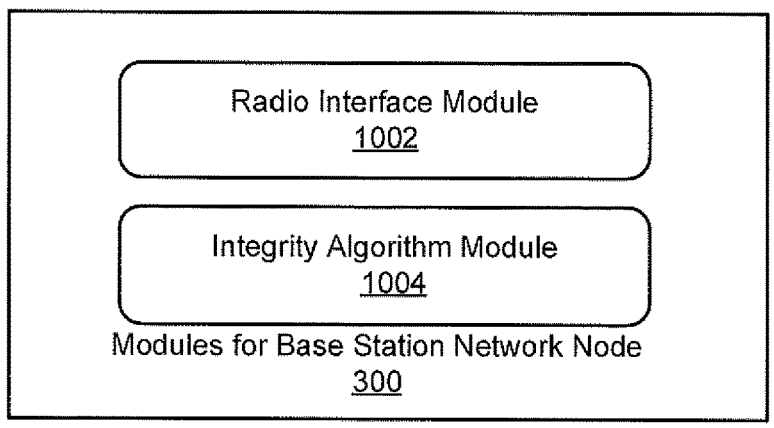
FIG. 10 illustrates modules for an eNodeB network node that perform operations as disclosed herein according to some embodiments.

FIG. 10 is a block diagram illustrating various functional modules of an eNodeB network node 300 according to some embodiments. As shown therein, an eNodeB network node 300 may include a radio interface module 1002 for establishing a radio resource control, RRC, connection with a user equipment, and receiving an indication of a security capability of the UE 200 from the UE 200, and an integrity algorithm module 1004 for generating a list of integrity algorithms supported by the eNodeB. The radio interface module 1002 is further configured for transmitting the list of supported integrity algorithms to a core network node 400, such as a mobility management entity, MME, receiving from the core network node 400 a selected integrity algorithm for generating an RRC message integrity key Krrc_int, and sending the selected integrity algorithm to the UE 200.

Figure 11:
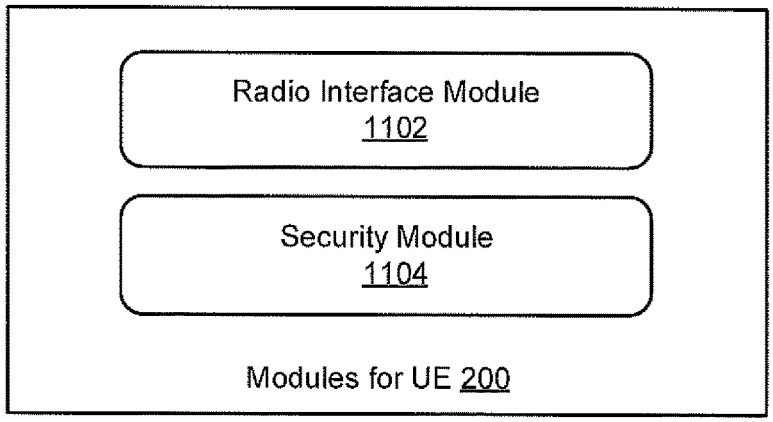
FIG. 11 illustrates modules for a UE that perform operations as disclosed herein according to some embodiments.

FIG. 11 is a block diagram illustrating various functional modules of a UE 200 according to some embodiments. As shown therein, a UE 200 may include a radio interface module 1102 and a security module 1104. The radio interface module 1102 is configured for establishing a radio resource control, RRC, connection with a source base station 300A, sending an indication of a security capability of the UE to the source base station 300A following establishment of the RRC connection, and receiving a non-access stratum, NAS, security mode command, SMC, from the source base station 300A, wherein the NAS SMC identifies a selected integrity algorithm for generating an RRC message integrity key Krrc_int. The security module 1104 is configured for generating the RRC message integrity key Krrc_int using the selected integrity algorithm and generating an RRC integrity token using the RRC message integrity key Krrc_int.

Figure 12:
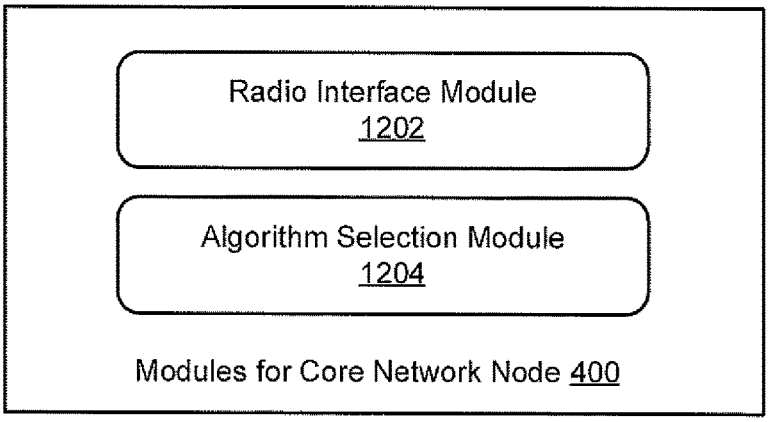
FIG. 12 illustrates modules for a core network node that perform operations as disclosed herein according to some embodiments.

FIG. 12 is a block diagram of a core network node 400 according to some embodiments. As shown therein, a core network node 400 may include a radio interface module 1202 for receiving, from an base station 300 that serves a user equipment, UE, a list of integrity algorithms supported by the base station 300 for generating an RRC message integrity key Krrc_int, and an algorithm selection module 1204 for selecting an integrity algorithm from the list of integrity algorithms. The radio interface module 1202 is further configured for transmitting a message identifying the selected integrity algorithm to the base station 300.

REFERENCES

1. TS 23.401, Rel-14
2. TS 33.401, Rel-14
3. TS 24.301, Rel-14
4. S3-161717 (3GPP TSG SA WG3 (Security) Meeting #85)
5. R3-161324

Abbreviations and Explanations

BS Base station
DL Downlink
eNB eNodeB
LTE Long Term Evolution
PDU Protocol data unit
PGW Packet gateway
RNC Radio Network Controller
RRC Radio resource control
SGW Signalling gateway
SMC Security Mode Command
UE User equipment
UL Uplink Further Definitions and Embodiments In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

What is claimed is:

1. A method of operating a user equipment ("UE") comprising:
    establishing a radio resource control ("RRC") connection with a source base station;
    subsequent to establishing the RRC connection, sending an indication of a security capability of the UE to the source base station;
    subsequent to sending the indication, receiving a non-access stratum ("NAS") message from the source base station, the NAS message includes an identifier of a selected security algorithm;
    responsive to receiving the NAS message, generating an access stratum security key based on the identifier of the selected security algorithm;
    generating an RRC integrity token using the selected security algorithm and the access stratum key;
    in response to a link failure between the UE and the source base station, transmitting the RRC integrity token to a target base station, wherein the source base station then receives the RRC integrity token from the target base station and verifies the RRC integrity token.

2. The method of claim 1, further comprising:
protecting access stratum communications between the UE and the source base station using the access stratum security key and the selected security algorithm.

3. The method of claim 1, wherein the NAS message comprises a NAS security mode command,
wherein the source base station comprises an eNodeB,
wherein the selected security algorithm comprises an integrity algorithm, and
wherein the access stratum security key comprises an RRC message integrity key ("Krrc_int").

4. The method of claim 1, wherein sending the indication of the security capability of the UE to the source base station comprises sending a request to the source base station, the request including the indication of the security capability of the UE, and
wherein the request comprises an Attach request.

5. The method of claim 1, further comprising:
generating a base station key ("KeNB"),
wherein generating the access stratum security key comprises generating the access stratum security key using the KeNB and the identifier of the selected integrity algorithm.

6. The method of claim 5, wherein the KeNB and the access stratum security key are generated prior to the link failure.

7. The method of claim 1, wherein transmitting the RRC integrity token to the target base station comprises transmitting the integrity token in an RRC ConnRe-est Request message.

8. The method of claim 7, further comprising:
receiving an RRC ConnRe-est Setup message in response to the RRC ConnRe-est Request message; and
in response to receiving the RRC ConnRe-est Setup message, transmitting an NAS Data protocol data unit to the target base station.

9. A user equipment ("UE") comprising:
processing circuitry; and
memory coupled to the processing circuitry and having instructions stored therein that are executable by the processing circuitry to cause the UE to perform operations comprising:
establishing a radio resource control ("RRC") connection with a source base station;
subsequent to establishing the RRC connection, sending an indication of a security capability of the UE to the source base station;
subsequent to sending the indication, receiving a non-access stratum ("NAS") message from the source base station, the NAS message includes an identifier of a selected security algorithm;
responsive to receiving the NAS message, generating an access stratum security key based on the identifier of the selected security algorithm;
generating an RRC integrity token using the selected security algorithm and the access stratum key;
in response to a link failure between the UE and the source base station, transmitting the RRC integrity token to a target base station, wherein the source base station then receives the RRC integrity token from the target base station and verifies the RRC integrity token.

10. A method of operating a network node of a cellular radio access network ("RAN"), wherein the network node is a source base station for a user equipment ("UE"), the method comprising:
establishing a radio resource control ("RRC") connection with the UE;
subsequent to establishing the RRC connection, receiving an indication of a security capability of the UE from the UE;
subsequent to receiving the indication, generating a list of security algorithms supported by the network node and the UE based on the UE capabilities;
transmitting the list of supported security algorithms to a core network node;
responsive to transmitting the list of supported security algorithms to the core network node, receiving from the core network node, a selected security algorithm;
transmitting an identifier of the selected security algorithm to the UE; and
in response to a link failure between the UE and the source base station:
receiving an RRC integrity token from a target base station for the UE, wherein the RRC integrity token is generated by the UE and sent to the target base station from the UE; and
verifying the RRC integrity token using the selected security algorithm and an RRC message integrity key.

11. The UE of claim 9, further comprising:
protecting access stratum communications between the UE and the source base station using the access stratum security key and the selected security algorithm.

12. The UE of claim 9, wherein the NAS message comprises a NAS security mode command,
wherein the source base station comprises an eNodeB,
wherein the selected security algorithm comprises an integrity algorithm, and
wherein the access stratum security key comprises an RRC message integrity key ("Krrc_int").

13. The UE of claim 9, wherein sending the indication of the security capability of the UE to the source base station comprises sending a request to the source base station, the request including the indication of the security capability of the UE, and wherein the request comprises an Attach request.

14. The UE of claim 9, further comprising:
generating a base station key ("KeNB"),
wherein generating the access stratum security key comprises generating the access stratum security key using the KeNB and the identifier of the selected integrity algorithm.

15. The UE of claim 9, wherein the KeNB and the access stratum security key are generated prior to the link failure.

16. The UE of claim 9, wherein transmitting the RRC integrity token to the target base station comprises transmitting the integrity token in an RRC ConnRe-est Request message.

17. The UE of claim 16, further comprising:
receiving an RRC ConnRe-est Setup message in response to the RRC ConnRe-est Request message; and
in response to receiving the RRC ConnRe-est Setup message, transmitting an NAS Data protocol data unit to the target base station.

18. A network node of a cellular radio access network ("RAN"), wherein the network node is a source base station for a user equipment ("UE"), the network node comprising:
processing circuitry; and
memory coupled to the processing circuitry and having instructions stored therein that are executable by the processing circuitry to cause the network node to perform operations comprising:

establishing a radio resource control ("RRC") connection with the UE;
subsequent to establishing the RRC connection, receiving an indication of a security capability of the UE from the UE;
subsequent to receiving the indication, generating a list of security algorithms supported by the network node and the UE based on the UE capabilities;
transmitting the list of supported security algorithms to a core network node;
responsive to transmitting the list of supported security algorithms to the core network node, receiving from the core network node, a selected security algorithm;
transmitting an identifier of the selected security algorithm to the UE; and
in response to a link failure between the UE and the source base station:
  receiving an RRC integrity token from a target base station for the UE, wherein the RRC integrity token is generated by the UE and sent to the target base station from the UE; and
  verifying the RRC integrity token using the selected security algorithm and an RRC message integrity key.

* * * * *